United States Patent [19]
Makuuchi et al.

[11] Patent Number: 6,090,328
[45] Date of Patent: Jul. 18, 2000

[54] METHOD OF SHAPING FROM A MIXTURE OF PREVULCANIZED NATURAL RUBBER LATEX AND WATER-SOLUBLE POLYMER AND THE RESULTING SHAPED ARTICLE

[75] Inventors: Keizo Makuuchi; Fumio Yoshii; Varghese Siby, all of Gunma-ken; Yosuke Katsumura, Saitama-ken, all of Japan

[73] Assignee: Japan Atomic Energy Research Institute, Tokyo, Japan

[21] Appl. No.: 09/201,762

[22] Filed: Dec. 1, 1998

[30] Foreign Application Priority Data

Dec. 12, 1997 [JP] Japan ................................ 9-342935

[51] Int. Cl.$^7$ .................. C08J 5/00; C08J 45/00; C08F 2/48
[52] U.S. Cl. .................. 264/331.11; 264/331.12; 264/331.13; 264/331.16; 264/330; 522/113; 522/2
[58] Field of Search ............... 525/56, 185, 187; 522/2, 113, 114, 122, 123, 116; 264/330, 331.11, 331.12, 331.13, 331.15, 331.16, 331.17, 331.18, 332.19, 331.21, 331.22

[56] References Cited

U.S. PATENT DOCUMENTS

| | | | |
|---|---|---|---|
| 4,010,235 | 3/1977 | Yardley et al. | 264/241 |
| 5,215,701 | 6/1993 | Gould et al. | 264/331.13 |

*Primary Examiner*—James J. Seidleck
*Assistant Examiner*—Sanza L. McClendon
*Attorney, Agent, or Firm*—Banner & Witcoff, Ltd.

[57] ABSTRACT

The tear strength of a vulcanized natural rubber latex shaped article is improved by shaping a mixture of a prevulcanized natural rubber latex and a water-soluble polymer. The prevulcanization of a natural rubber latex may be done by exposure to a radiation. The water-soluble polymer may be selected from the group consisting of polyvinyl alcohol, polyethylene oxide, polyvinyl pyrrolidone and mixtures thereof. The water-soluble polymer may be added to the vulcanized natural rubber latex in an amount of 1–10 parts by weight per 100 parts by weight of the natural rubber.

2 Claims, No Drawings

METHOD OF SHAPING FROM A MIXTURE OF PREVULCANIZED NATURAL RUBBER LATEX AND WATER-SOLUBLE POLYMER AND THE RESULTING SHAPED ARTICLE

BACKGROUND OF THE INVENTION

The present invention relates to an improvement of the mechanical properties of a natural rubber latex film that has been prevulcanized, particularly with radiation. More specifically, the present invention relates to a method of improving the tear strength of a radiation vulcanized natural rubber latex shaped article by shaping a mixture of a radiation vulcanized natural rubber and a water-soluble polymer. The invention also relates to the thus improved rubber latex shaped article.

Radiation vulcanization of natural rubber latices does not involve the use of sulfur or dithiocarbamates and, hence, shaped articles of radiation vulcanized natural rubber latices do not contain nitrosoamine and have an advantages of low cytotoxicity. In addition, they give rise to small amounts of $SO_2$ and ash after burning.

On the other hand, the radiation vulcanized natural rubber latex shaped article solely relies upon the interlinking of rubber molecules for the binding of rubber particles and, hence, suffers from the problem of low tear strength.

The present invention solves these problems by providing a latex product having high safety in various biological aspects. With a view to improving the tear strength of latex shaped articles, the present inventors previously proposed a method of adding an emulsion of poly(methyl methacrylate) to a radiation vulcanized natural rubber latex. However in that method, about 30 parts by weight of poly(methyl methacrylate) had to be added to 100 parts by weight of the rubber and this resulted in the loss of the advantages of the natural rubber. Thus, the method was not considered to be practically feasible. According to the literature, the tear strength of latex products can be improved by addition of silica gel. However, the use of inorganic additives leads to the generation of ash when rubber products are disposed of by incineration and one great advantage of radiation vulcanization, i.e., a reduced ash content from disposal by incineration, is cancelled.

Under the circumstances, it is an object of the present invention to improve the tear strength of a radiation vulcanized natural rubber latex shaped article that gives rise to a small ash content when disposed of by incineration and which yet is improved in tear strength.

SUMMARY OF THE INVENTION

Noting water-soluble polymers as additives that would give rise to a small ash content upon disposal by incineration, the present inventors conducted an intensive study on the effect of adding various water-soluble polymers to a radiation vulcanized natural rubber latex. As a result, it was found that the tear strength of the latex could be improved by adding specified water-soluble polymers. The present invention has been accomplished on the basis of this finding.

Thus, in its first aspect, the present invention relates to a method of improving the tear strength of a vulcanized natural rubber latex shaped article by shaping mixture of a prevulcanized natural rubber latex and a water-soluble polymer.

In its second aspect, the present invention relates to the shaped article produced by the above-described method.

In a preferred embodiment of the first aspect, the prevulcanization of a natural rubber latex is done by exposure to a radiation.

In another preferred embodiment, the water-soluble polymer is selected from the group consisting of polyvinyl alcohol, polyethylene oxide, polyvinyl pyrrolidone and mixtures thereof.

In yet another preferred embodiment, the water-soluble polymer is added to the vulcanized natural rubber latex in an amount of 1–10 parts by weight per 100 parts by weight of the natural rubber.

DETAILED DESCRIPTION OF THE INVENTION

Rubber products of which the tear strength can be improved in accordance with the present invention are those which are produced from radiation vulcanized natural rubber latices and which include various kinds of gloves such as surgical rubber gloves, inspection rubber gloves and household rubber gloves, and miscellaneous rubber products including catheters, condoms and balloons. These rubber products can be manufactured by various methods including the following two; i) a mold is placed in a radiation vulcanized natural rubber latex and the latex adhering to the surfaces of the mold are dried; and ii) the latex is cast over a mold and allowed to set.

Radiation vulcanized natural rubber latices can be manufactured by various known methods, including exposure to an electron beam in the presence or absence of vulcanization accelerators such as n-butyl acrylate. The concept of the present invention is applicable to all kinds of radiation vulcanized natural rubber latices independent of the method of radiation vulcanization.

The water-soluble polymer to be used in accordance with the present invention is selected from the group consisting of polyvinyl alcohol, polyethylene oxide, polyvinyl pyrrolidone and mixtures thereof. If polyvinyl alcohol is to be used, grades having a saponification degree of at least 98% are preferred for the purpose of achieving improvement in tear strength. "GOSENOL-KH-20", manufactured by The Nippon Synthetic Chemical Industry Co., Ltd. has a saponification degree of 70–85% and is effective in improving the clarity of shaped articles. The water-soluble polymers mentioned above are all effective in improving the tear strength of radiation vulcanized rubber and easily available at low cost; hence, those water-soluble polymers have a very high practical value. These water-soluble polymers are formulated as aqueous solution and added to the radiation vulcanized natural rubber latex. They are added in 1–10 parts by weight per 100 parts by weight of the natural rubber. Below 1 part by weight, the polymers are not effective at all as the additive; beyond 10 parts by weight, the inherent physical properties of the rubber may potentially be lost.

The aqueous solution of the water-soluble polymer may be prepared by any industrially common method. The concentration of the water-soluble polymer must be within the range of 5–30%; below 5%, an increased amount of the polymer solution must be added to the radiation vulcanized natural rubber latex, leading to a lower rubber concentration. Aqueous solutions of more than 30% of the water-soluble polymer are so viscous that they lower the operating efficiency.

The temperature of the aqueous solution of the water-soluble polymer to be used in accordance with the present invention is not limited to any particular value but is preferably in the range of 0–50° C.

The addition of the water-soluble polymer is effective not only in improving tear strength but also for the purpose of improving thermal aging resistance and lowering stickiness (tackiness). Although the exact reason is not known, the water-soluble polymer interacts in some special way with the protein in the latex to form a complex, which in turn dissolves in water in the process of leaching. The resulting shaped article hence has non-detectable water-extractable proteins present.

The present invention will now be described in greater detail by reference to the following examples. Since rubber latices are natural products, their properties may vary with the place of production, its weather and the season. Hence, physical data may occur that differ from those shown in the following examples but this will be no means compromise the essential significance of the present invention.

Example 1

A glass flask equipped with a stirring rod was charged with 750 g of a high-ammonia natural rubber latex (product of Malaysia; rubber solids, 60.1%), to which 150 ml of 1% aqueous ammonia and 9 ml of 10% aqueous potassium hydroxide were added under stirring at a speed of 40 rpm. To the resulting latex, n-butyl acrylate (product of TOAG-OSEI CO., LTD., containing 15 ppm of MEHQ) and the mixture was stirred for 30 min. The mixture was then transferred into a 1-L polyethylene box and irradiated with γ-rays from $^{60}$Co at a dose rate of 10 kGy/h for 2 h at room temperature. A radiation vulcanized natural rubber latex formed, which is hereinafter designated RVL.

Ten grams of polyvinyl alcohol (product of KURARAY CO., LTD.; PVA-117 with a polymerization degree of 1,700 and a saponification degree of 98–99%) was dissolved in 90 g of water to prepare a 10% aqueous solution of PVA-117. Varying amounts (see FIG. 1 below) of the aqueous solution were added to RVL and the mixture was fully stirred, cast over a horizontal glass plate and dried at room temperature until it became clear. Thereafter, a 0.45-mm thick film was detached from the glass plate. The film was then leached with 1% aqueous ammonia for 24 h and subsequently dried at 80° C for 1 h. The physical properties of the dry film were measured in accordance with JIS Z 6301. The results are shown in Table 1.

TABLE 1

Effect of Addition of Polyvinyl Alcohol

| Addition of PVA (in grams per 100 g of rubber) | Tensile strength, MPa | Tear strength, kN |
| --- | --- | --- |
| 0 | 31 | 20 |
| 1 | 30 | 21 |
| 2 | 29 | 23 |
| 3 | 28 | 26 |
| 4 | 27 | 29 |
| 5 | 25 | 33 |
| 6 | 24 | 37 |

Upon addition of polyvinyl alcohol, the tensile strength decreased somewhat but obviously the tear strength improved.

Example 2

A similar test was conducted with the polyvinyl alcohol of Example 1 being replaced by a 10% aqueous solution of polyethylene oxide (E-30, product of Meisei Kagaku Kogyo K.K.; $\overline{Mv}=3\times10^5$–$5\times10^5$). The result is shown in Table 2 below.

TABLE 2

Effect of Addition of Polyethylene Oxide

| Addition of PEO (in grams per 100 g of rubber) | Tensile strength, MPa | Tear strength, kN |
| --- | --- | --- |
| 0 | 31 | 20 |
| 1 | 30 | 21 |
| 2 | 29 | 22 |
| 3 | 28 | 23 |
| 4 | 27 | 23 |
| 5 | 25 | 25 |
| 6 | 24 | 27 |

Though being inferior to polyvinyl alcohol, polyethylene oxide was obviously effective in improving tear strength.

Example 3

A similar test was conducted using a mixture of the 10% aqueous PVA solution of Example 1 and the 10% aqueous PEO ($\overline{Mv}=3\times10^5$) solution of Example 2. The total addition of PVA and PEO was 6 grams for 100 g of rubber, and the mixing ratio of PVA and PEO was varied as shown in Table 3 below. The result of the test is also shown in Table 3.

TABLE 3

Effect of Addition of Combined PEO and PVA

| Mixing ratios of PEO and PVA (in 6 grams per 100 g of rubber) | Tensile strength, MPa | Tear strength, kN |
| --- | --- | --- |
| 6:0 | 28 | 25 |
| 5:1 | 30 | 27 |
| 4:2 | 29 | 37 |
| 3:3 | 28 | 38 |
| 2:4 | 25 | 38 |
| 1:5 | 25 | 38 |
| 0:6 | 25 | 38 |

Obviously, the combined addition of polyethylene oxide and polyvinyl alcohol was also effective in improving tear strength.

The present invention offers two characteristic and significant advantages, one being the ability to improve the tear strength of a radiation vulcanized natural rubber latex shaped article by shaping a mixture of a radiation prevulcanized natural rubber latex with a water-soluble polymer, and the other being reduced generation of ash from the radiation vulcanized natural rubber shaped article upon disposal by incineration.

What is claimed is:

1. A process of preparing a vulcanized natural rubber latex article comprising:

exposing natural rubber latex to radiation to prevulcanize said natural rubber latex;

mixing the radiation-prevulcanized natural rubber latex with a water-soluble polymer to form a mixture, wherein said water-soluble polymer is selected from the group consisting of polyvinyl alcohol, polyethylene oxide, polyvinyl pyrrolidone, and mixtures thereof, and wherein said water-soluble polymer is added to said rubber latex in an amount of from 1 to 10 parts by weight per 100 parts of said rubber latex;

casting an aqueous solution of said mixture in a mold, wherein said mixture adheres to a surface of the mold; and drying said aqueous solution to obtain a vulcanized natural rubber latex article, wherein said article has improved tear strength, improved thermal aging resistance, reduced tackiness, and a non-detectable amount of water-extractable proteins.

2. A vulcanized natural rubber latex article produced by the process of claim 1.

* * * * *